United States Patent
Onishi (10) Patent No.: US 7,419,292 B2
(45) Date of Patent: Sep. 2, 2008

(54) ILLUMINATING DEVICE

(75) Inventor: Yasunori Onishi, Azumino (JP)

(73) Assignee: Seiko Epson Corporation (JP)

( * ) Notice: Subject to any disclaimer, the term of this patent is extended or adjusted under 35 U.S.C. 154(b) by 142 days.

(21) Appl. No.: 11/330,872

(22) Filed: Jan. 12, 2006

(65) Prior Publication Data

US 2006/0181899 A1    Aug. 17, 2006

(30) Foreign Application Priority Data

Feb. 16, 2005    (JP) ............................. 2005-038727

(51) Int. Cl.
*F21V 7/04* (2006.01)

(52) U.S. Cl. ...................... 362/620; 362/607; 362/626; 362/339

(58) Field of Classification Search ................. 362/326, 362/339, 606–607, 620, 626; 349/57
See application file for complete search history.

(56) References Cited

U.S. PATENT DOCUMENTS

| RE37,377 | E * | 9/2001 | Gunjima et al. | ................. 349/9 |
| 6,344,886 | B2 * | 2/2002 | Oki et al. | ...................... 349/65 |
| 6,921,178 | B2 * | 7/2005 | Ohkawa | ..................... 362/620 |

FOREIGN PATENT DOCUMENTS

| JP | 07-174910 | 7/1995 |
| JP | 07-174919 | 7/1995 |

* cited by examiner

*Primary Examiner*—Sandra O'Shea
*Assistant Examiner*—Jason Moon Han
(74) *Attorney, Agent, or Firm*—Harness, Dickey & Pierce, P.L.C.

(57) ABSTRACT

An illuminating device includes a light source, an optical waveguide that emits light from the light source through an emission surface thereof, and a prism sheet that is provided on the emission surface side of the optical waveguide. In the illuminating device, the following relationship is established between a refractive index x of the prism sheet and an apex angle y of a prism: $y = 107.86x - 140.43 + M$ ($-4 \leq M \leq 4$).

7 Claims, 8 Drawing Sheets

| REFRACTIVE INDEX | 2.1 | 2.0 | 1.9 | 1.8 | 1.7 | 1.6 | 1.5 |
|---|---|---|---|---|---|---|---|
| A: APEX ANGLE WHEN INCIDENT ANGLE IS 70° | 86 | 79 | 69 | 59 | 48 | 35 | 20 |
| B: APEX ANGLE WHEN INCIDENT ANGLE IS 76° | 82 | 76 | 67 | 56 | 45 | 32 | 18 |
| C: APEX ANGLE WHEN INCIDENT ANGLE IS 82° | 82 | 73 | 64 | 54 | 42 | 29 | 14 |
| DIFFERENCE BETWEEN A AND B | 4 | 3 | 2 | 3 | 3 | 3 | 2 |
| DIFFERENCE BETWEEN B AND C | 0 | -3 | -3 | -2 | -3 | -3 | -4 |

ILLUMINATING DEVICE

BACKGROUND

1. Technical Field

The present invention relates to an illuminating device, such as a backlight unit used for, for example, a liquid crystal display device of a cellular phone.

2. Related Art

A liquid crystal display device includes a backlight unit on the rear surface side of a liquid crystal display panel to perform transmissive display. In general, the backlight unit is composed of an illuminating device including a light source, an optical waveguide for emitting light from the light source to the rear surface of the liquid crystal display panel as surface light, a sheet for diffusing light emitted from the optical waveguide, and a prism sheet for condensing light. Light incident on the optical waveguide from the light source travels in the optical waveguide while repeatedly reflecting from an emission surface and a reflective surface of the optical waveguide, and is then emitted from the emission surface to the outside.

The light emitted from the optical waveguide is incident on the prism sheet. The prism sheet refracts the incident light to change the traveling direction of light. In this way, the prism sheet can emit light toward the liquid crystal display panel. JP-A-7-174910 discloses a prism sheet formed of a material having a high refractive index. The prism sheet having a high refractive index can refract light at a large angle to make it incident on the liquid crystal display panel in the vertical direction, resulting in an improvement in the brightness of an illuminating device.

However, the optical waveguide emits light mainly in a specific direction light, rather than uniformly in all directions. Therefore, merely increasing the refractive index of the prism sheet without taking the characteristics of light emitted from the optical waveguide into consideration is insufficient for improving the brightness of an illuminating device.

SUMMARY

An advantage of some aspects of the invention is that it provides an illuminating device having high brightness and high usage efficiency of light by improving the refractive index of a prism sheet and by forming prisms in a shape most suitable for the refractive index of the prism sheet.

According to an aspect of the invention, an illuminating device includes a light source; an optical waveguide that emits light from the light source through an emission surface thereof; and a prism sheet that is provided on the emission surface side of the optical waveguide. In the illuminating device, the following relationship is established between a refractive index x of the prism sheet and an apex angle y of a prism: $y=107.86x-140.43+M$ ($-4 \leq M \leq 4$).

According to this structure, the illuminating device can be suitably used for, for example, a backlight unit of a liquid crystal display device, and includes the light source, the optical waveguide for emitting light from the light source through the emission surface thereof, and the prism sheet provided on the emission surface side of the optical waveguide. For example, an LED is used for the light source. Light emitted from the light source travels in the optical waveguide while being repeatedly reflected from the emission surface and the reflective surface of the optical waveguide and is then emitted from the emission surface to the prism sheet. The prism sheet is formed such that the following relationship is established between the refractive index x of the prism sheet and the apex angle y of the prism: $y=107.86x-140.43+M$ ($-4 \leq M \leq 4$). This structure makes it possible to reduce the number of parts and to manufacture an illuminating device having high brightness and high usage efficiency of light.

Further, according to another aspect of the invention, an illuminating device includes a light source; an optical waveguide that emits light from the light source through an emission surface thereof; and a prism sheet that is provided on the emission surface side of the optical waveguide. In the illuminating device, the following relationship is established between a refractive index x of the prism sheet and an apex angle y of a prism: $y=107.86x-140.43$.

Furthermore, in the above-mentioned structure, it is preferable that the illuminating device further include a diffusing sheet that is provided on the emission surface side of the prism sheet to diffuse light. According to this structure, light emitted from the prism sheet is diffused, so that uniform brightness is obtained, which makes it possible to suppress the occurrence of moiré between the prism sheet and the liquid crystal panel.

Moreover, in the above-mentioned structure, it is preferable that the illuminating device further include a second prism sheet that is provided on the emission surface side of the prism sheet such that the ridges of prisms of the first and second prism sheets are perpendicular to each other. According to this structure, it is possible to refract light components emitted in the ridge direction of toward the liquid crystal panel.

Further, in the above-mentioned structure, it is preferable that the illuminating device further include a diffusing sheet that is provided on the emission surface side of the second prism sheet to diffuse light. According to this structure, it is possible to suppress the occurrence of moiré and to make light components whose traveling directions are perpendicular to the ridge direction of the prism sheet travel toward the liquid crystal panel.

Furthermore, in the above-mentioned structure, it is preferable that the optical waveguide emit light so as to be incident on the prism sheet at an angle of 70° to 82°. This structure makes it possible to improve brightness and usage efficiency of light.

Moreover, in the above-mentioned structure, it is preferable that the optical waveguide emit light so as to be incident on the prism sheet at an angle of 76°.

Further, in the above-mentioned structure, it is preferable that the optical waveguide include a reflective surface that is opposite to the emission surface; and a light incident surface on which light emitted from the light source is incident. Preferably, the optical waveguide has a wedge shape in sectional view in which the larger a distance from the light incident surface is, the smaller a gap between the emission surface and the reflective surface becomes, and the inclination angle of the reflective surface is smaller than 5°.

Furthermore, in the above-mentioned structure, it is preferable that the optical waveguide include a reflective surface that is opposite to the emission surface; and a light incident surface on which light emitted from the light source is incident. Preferably, the optical waveguide has a wedge shape in sectional view in which the larger a distance from the light incident surface is, the smaller a gap between the emission surface and the reflective surface becomes. In addition, it is preferable that an effective reflective surface of the reflective surface be formed in a step shape and that the inclination angle of the effective reflective surface be smaller than 5°.

Moreover, in the above-mentioned structure, it is preferable that the optical waveguide include a reflective surface that is opposite to the emission surface; and a light incident surface on which light emitted from the light source is incident. Preferably, a concave prism pattern perpendicular to a traveling direction of light emitted from the light source is formed in the reflective surface, and the inclination angle of an effective reflective surface of the prism pattern is smaller than 5°.

Further, in the above-mentioned structure, it is preferable that the optical waveguide include a reflective surface that is opposite to the emission surface; and a light incident surface on which light emitted from the light source is incident. Preferably, a concave prism pattern perpendicular to a traveling direction of light emitted from the light source is formed in the emission surface of the optical waveguide, and the inclination angle of an effective reflective surface of the prism pattern is smaller than 5°.

According to still another aspect of the invention, an electro-optical device includes a display panel; and the illuminating device used as a backlight for the display panel. According to this aspect, it is possible to provide an electro-optical device having high brightness and high usage efficiency of light.

According to yet another aspect of the invention, an electronic apparatus includes the electro-optical device as a display unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings.

Structure of Liquid Crystal Display Device

Figure 1:
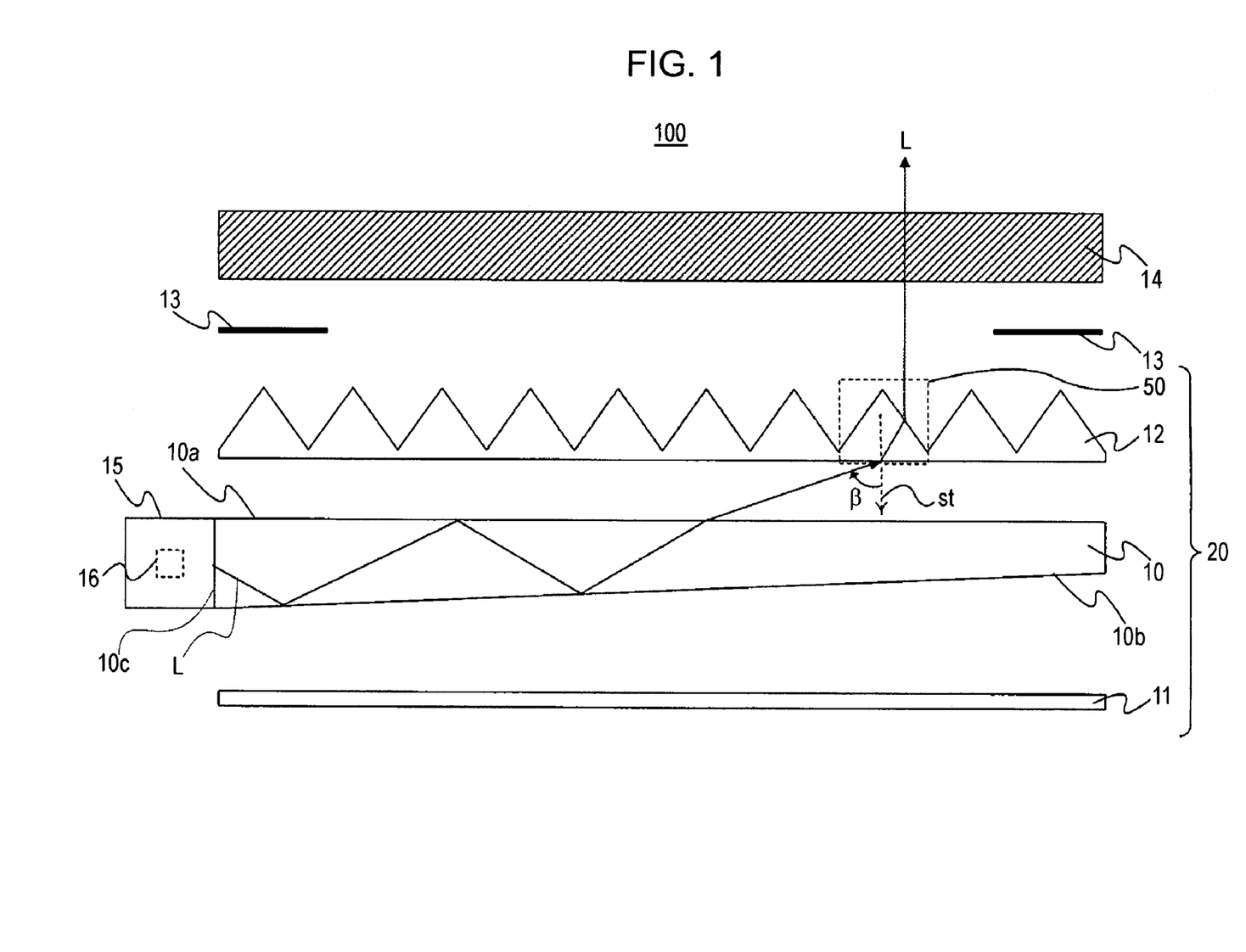
FIG. 1 is a side view schematically illustrating the structure of a liquid crystal display device according to an embodiment of the invention.

FIG. 1 shows the schematic structure of a liquid crystal display device 100 provided with an illuminating device according to the invention. In FIG. 1, an illuminating device 20 of the invention is a surface-emitting-type illuminating device used as a backlight unit, for example, in the liquid crystal display device 100. The illuminating device 20 includes an optical waveguide 10 having a light source 15 at one end, a reflective sheet 11 provided below the optical waveguide 10, and a prism sheet 12 provided above the optical waveguide 10. The illuminating device 20 is adhered to a liquid crystal panel 14 by a double-sided tape 13.

In the illuminating device 20, a light source 15 includes a plurality of LEDs 16 serving as point light sources and emits light to an end surface (hereinafter, referred to as a 'light incident surface') 10c of the optical waveguide 10 opposite to the light source. The optical waveguide 10 has a rectangular plate shape and is formed of a transparent resin, such as acrylic resin. An upper surface 10a of the optical waveguide 10 serves as a surface for emitting light (hereinafter, referred to as a 'light emission surface'), and a lower surface 10b thereof serves as a light reflecting surface (hereinafter, referred to as a 'reflective surface').

A light component L emitted from the light source 15 is incident on the optical waveguide 10 through the light incident surface 10c and travels between the reflective surface 10b and the light emission surface 10a while being repeatedly reflected therefrom. Then, when an angle formed between the light component and the light emission surface 10a is larger than a threshold angle, the light component is emitted to the outside through the light emission surface 10a. Meanwhile, when the light component L passes through the reflective surface 10b at an angle larger than the threshold angle, the light component L is reflected to the optical waveguide 10 by the reflective sheet 11.

As shown in FIG. 1, when a direction perpendicular to the bottom of the prism sheet 12 is a direction st, the light component L emitted from the optical waveguide 10 is incident on the prism sheet 12 at an angle 'β' with respect to the direction st. The prism sheet 12 has triangular prisms on a surface thereof facing the liquid crystal panel 14. The light component L incident on the prism sheet 12 is refracted by the prism and is emitted toward the liquid crystal panel 14 as a light component L1. The light component L1 refracted by the prism sheet 12 is incident on the rear surface of the liquid crystal panel 14. This structure enables the liquid crystal display device 100 to perform transmissive display.

Refractive Index and Reflection Range of Prism Sheet

Figure 2A:
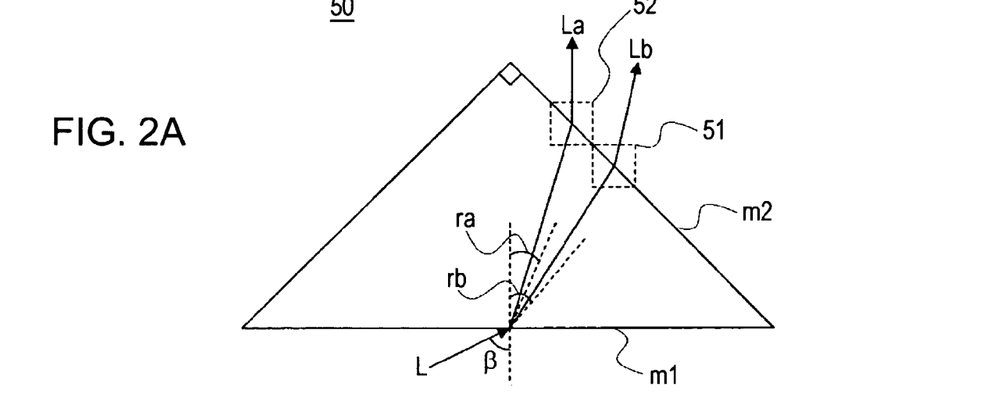
FIGS. 2A to 2C are enlarged views illustrating a prism having an apex angle of 90° provided in a prism sheet of the invention.

First, the relationship between the refractive index and the light reflection range of the prism sheet will be described. FIG. 2A is an enlarged view of one prism 50 on the prism sheet 12 shown in FIG. 1. In FIG. 2A, one prism of the prism sheet 12 has an isosceles triangular shape having an apex angle of 90° in sectional view. An optical path in the prism sheet 12 depends on the refractive index of the prism sheet. In FIG. 2A, the path of the light component L passing through a portion of the prism sheet 12 having a refractive index of 2 is represented by a light component La, and the path of the light component L passing through another portion of the prism sheet 12 having a refractive index of 1.5 is represented by a light component Lb.

The light component L incident on the prism 50 is refracted by a base m1 of the prism 50. When the maximum value of a refraction angle of the light component Lb passing through a portion of the prism sheet 12 having a refractive index of 1.5 is an angle 'rb' and the maximum value of a refraction angle of the light component La passing through another portion of the prism sheet 12 having a refractive index of 2 is an angle 'ra', the angles rb and ra are threshold angles of light components passing through portions of the prism sheet 12 having the above-mentioned refractive indexes. The threshold angles are values determined by only the refractive index of the prism sheet by Snell's law. Therefore, the angles rb and ra can be calculated by the following expressions 1 to 3.

[Expression 1] (1)
$$\frac{1}{\sin(rb)} = \frac{1.5}{1}$$

[Expression 2] (2)
$$\frac{1}{\sin(ra)} = \frac{2}{1}$$

[Expression 3] (3)
$$rb = 42° \; ra = 30°$$

The light component L has a refraction angle larger than the angles ra and rb, and is not incident on the prism sheet 12. The emission angle of light emitted to the outside by the side m2 of the triangle of the prism sheet 12 can be calculated on the basis of the angles ra and rb.

Figure 2B:
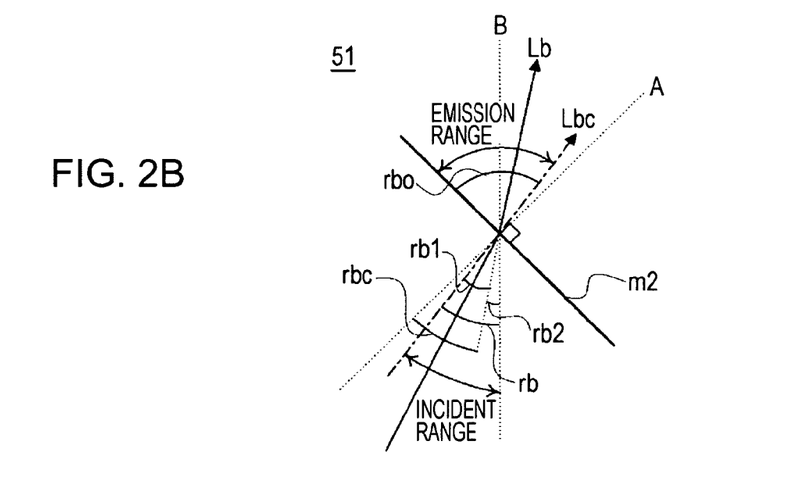

FIG. 2B is an enlarged view of a portion 51 of a side m2 of the triangular prism 50. In FIG. 2B, when the prism sheet 12 has a refractive index of 1.5, the light component Lb is emitted from the side m2 of the triangle. In FIG. 2B, a straight line A is a normal line to the side m2, and a straight line B is a vertical line to the base m1. As described above, since the refraction angle of the light component L by the bottom m1 does not exceed the angle rb, the incident range of the light component L incident on the side m2 is in the range of the angle rb with respect to the straight line B. Meanwhile, when the light component Lb is emitted from the side m2, the incident angle of the light component Lb on the side m2 is needed to be smaller than a threshold angel rbc of the side m2. The reason is that, when the incident angle of the light component Lb on the side m2 is larger than the threshold angle rbc, the light component Lb is totally reflected from the side m2. Therefore, only light components incident in the range of an angle rb1, which is an incident angle smaller than the threshold angle rbc, among the light components Lb in the range of the angle rb can be refracted by the side m2 to be emitted to the outside. Meanwhile, since light components in the range of an angle rb2 among the light components Lb in the range of the angle rb have an incident angle larger than the threshold angle rbc, they are totally reflected from the side m2. As described above, since the threshold angle rbc is determined by only the refractive index of the prism sheet 12, it is equal to the angle rb, which is a threshold angle when the light component L is incident on the base m1. In this way, an angle rbo formed between the side m2 and the refraction direction of a light component Lbc incident on the side m2 at an angle rb with respect to the straight line B, which is represented by a one-dot chain line, has the maximum value in the emission range of the light component Lb from the side m2. The angles rb1, rb2, and rbo can be calculated by the following expressions 4 to 7.

[Expression 4] (4)
$$rb1 = rb + rbc - 45°$$
$$= 2 \times rb - 45°$$
$$= 39°$$

[Expression 5] (5)
$$rb2 = rb - rb1$$
$$= 3°$$

[Expression 6] (6)
$$\frac{\sin(90° - rbo)}{\sin(rbc - rb1)} = \frac{1.5}{1}$$

[Expression 7] (7)
$$rbo = 86°$$

In this way, it is possible to calculate the angle rbo=86°. That is, the light component Lb is emitted in the angular range of smaller than 86° with respect to the side m2.

Figure 2C:
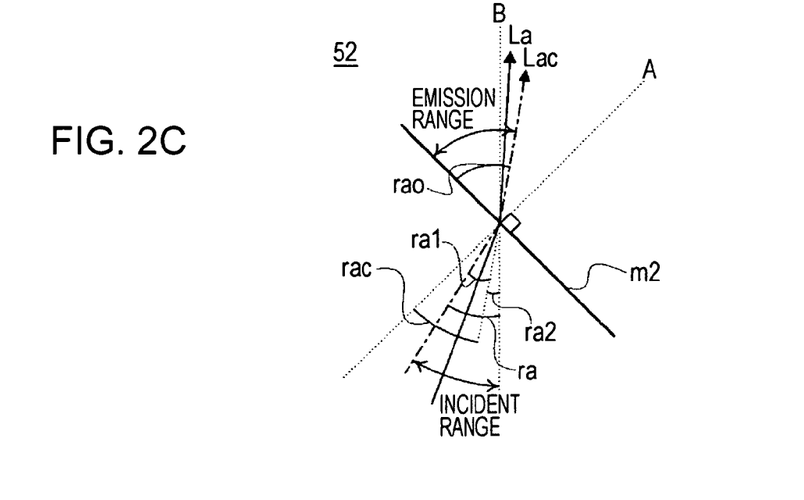

Even when the prism sheet 12 has a refractive index of 2, the method can calculate the emission range of the light component La. FIG. 2C is an enlarged view of a portion 52 of the side m2 of the triangular prism 50. In FIG. 2C, when the prism sheet 12 has a refractive index of 2, the light component La is emitted from the side m2 of the triangle. In FIG. 2C, the straight line A indicates a normal line to the side m2, and the straight line B indicates a normal line to the base m1. Since the refraction angle of the light component L by the base m1 does not exceed the angle ra, the incident range of the light component La incident on the side m2 is in the range of the angle ra with respect to the straight line B. Meanwhile, when the light component La is emitted from the side m2, the incident angle of the light component La on the side m2 is needed to be smaller than a threshold angel rac of the side m2. The reason is that, when the incident angle of the light component La on the side m2 is larger than the threshold angle rac, the light component La is totally reflected from the side m2. Therefore, only light components La incident in the range of an angle ra1, which is an incident angle smaller than the threshold angle rac, among the light components La in the range of an angle ra can be refracted by the side m2 to be emitted to the outside. Meanwhile, since light components in the range of an angle ra2 among the light components La in the range of the angle ra have an incident angle larger than the threshold angle rac, they are totally reflected from the side m2. Since the threshold angle rac is determined by only the refractive index of the prism sheet 12, it is equal to the angle ra, which is a threshold angle when the light component L is incident on the base m1. In this way, an angle rao formed between the side m2 and the refraction direction of a light component Lac incident on the side m2 at the angle ra with respect to the straight line B, which is represented by a one-dot chain line, has the maximum value in the emission range of the light component La from the side m2. The angles ra1, ra2, and rao can be calculated by the following expressions 8 to 11.

[Expression 8] (8)
$$ra1 = ra + rac - 45°$$
$$= 2 \times ra - 45°$$
$$= 15°$$

[Expression 9] (9)
$$ra2 = ra - ra1$$
$$= 15°$$

-continued

[Expression 10]
$$\frac{\sin(90° - rao)}{\sin(rac - ra1)} = \frac{2}{1} \qquad (10)$$

[Expression 11]
$$rbo = 59° \qquad (11)$$

In this way, it is possible to calculate the angle rao=59°. That is, the light component L is emitted in the angular range of smaller than 59° with respect to the side m2.

When the prism sheet 12 having a refractive index of 2 is used, the light component L can be refracted at an angle closer to the normal direction to the base m1, compared with the case in which the prism sheet 12 having a refractive index of 1.5 is used. That is, the use of a prism sheet having a high refractive index makes it possible to emit light to the liquid crystal panel 14 at an angle closer to the normal direction to an incident surface. In addition, the prism sheet 12 can be formed of a material having a high refractive index, such as a polymer resin containing sulfur in polycarbonate or a polyaddition resin of acryloylaminopyridine derivative and dithiol.

Optimum Shape of Prism Sheet

Figure 3:
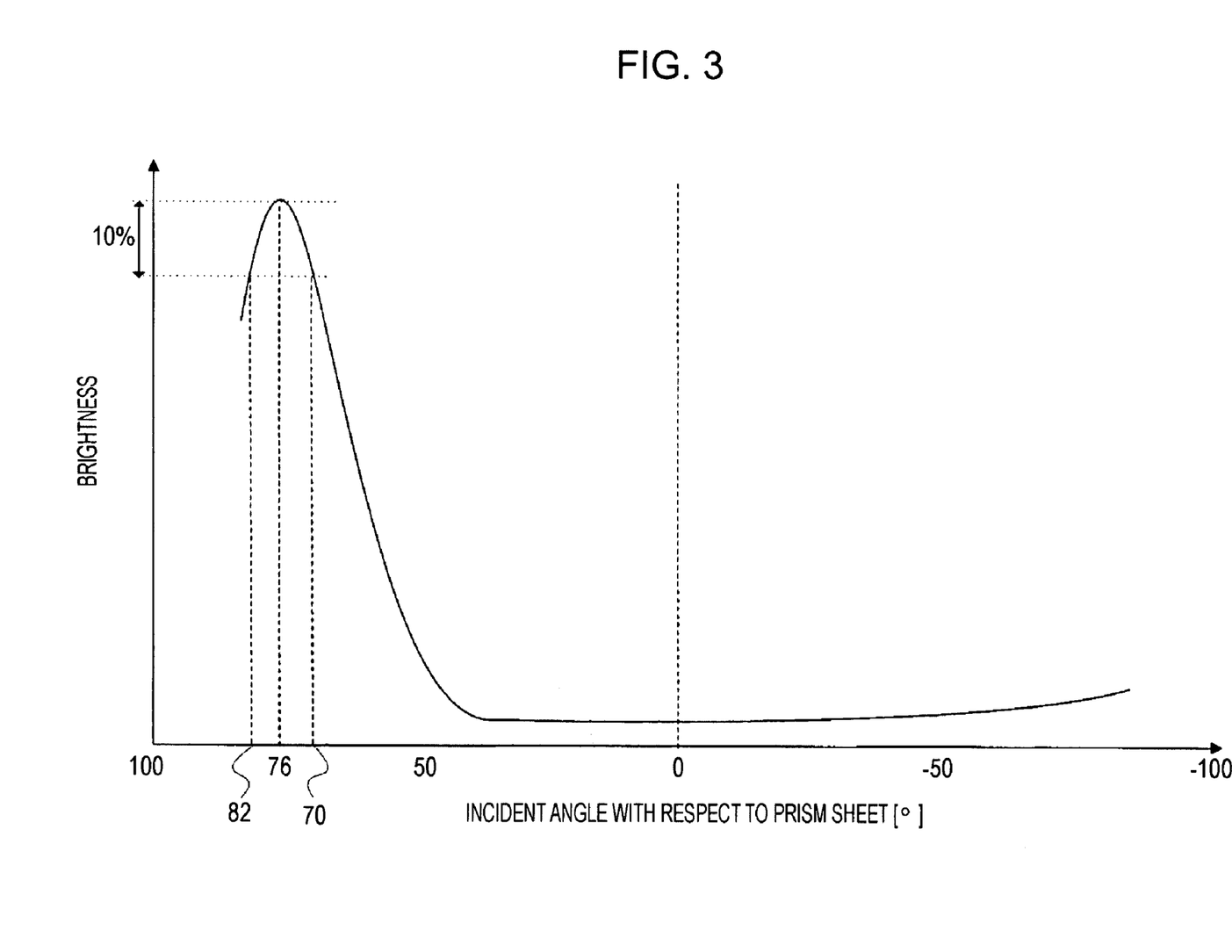
FIG. 3 is a graph illustrating the incident angle of light on the prism sheet and the brightness of light emitted from an optical waveguide.

Next, the optimum shape of the prism sheet for achieving an illuminating device having high brightness will be described. The light component L travels in the optical waveguide 10 while being reflected in various optical paths and is then emitted from the emission surface 10a of the optical waveguide 10 in various directions. FIG. 3 shows the relationship between the incident angle of light on the prism sheet and the brightness of the optical waveguide in a general illuminating device. As shown in FIG. 3, when light is incident on the prism sheet at an angle of 76°, light having the highest brightness is emitted from the optical waveguide. That is, FIG. 3 shows that the largest amount of light is incident on the prism sheet at an angle of 76°. Referring to FIG. 1, among the light components traveling in the optical waveguide 10, a light component incident on the prism sheet 12 at an angle β of 76° has the highest brightness. In other words, among the light components traveling in the optical waveguide 10 along various paths, the largest amount of light is incident on the prism sheet 12 at an angle β of 76°.

Further, as shown in FIG. 3, when light is incident on the prism sheet at angles of 70° and 82°, the brightness of the optical waveguide is reduced by 10% of the highest brightness. Therefore, when the incident angle is in the angular range of 70° to 82° including 76°, the brightness of the optical waveguide is 90% or more of the highest brightness. When the prism sheet 12 capable of emitting light having 90 or more percent of the highest brightness to the liquid crystal panel 14 in the normal direction is formed, it is possible to manufacture an illuminating device having high brightness and high usage efficiency of light. More specifically, the prisms of the prism sheet 12 may be formed in shapes causing the light component L incident thereon at an angle β of 70° to 82° to be vertically emitted toward the liquid crystal panel 14.

Figure 4:
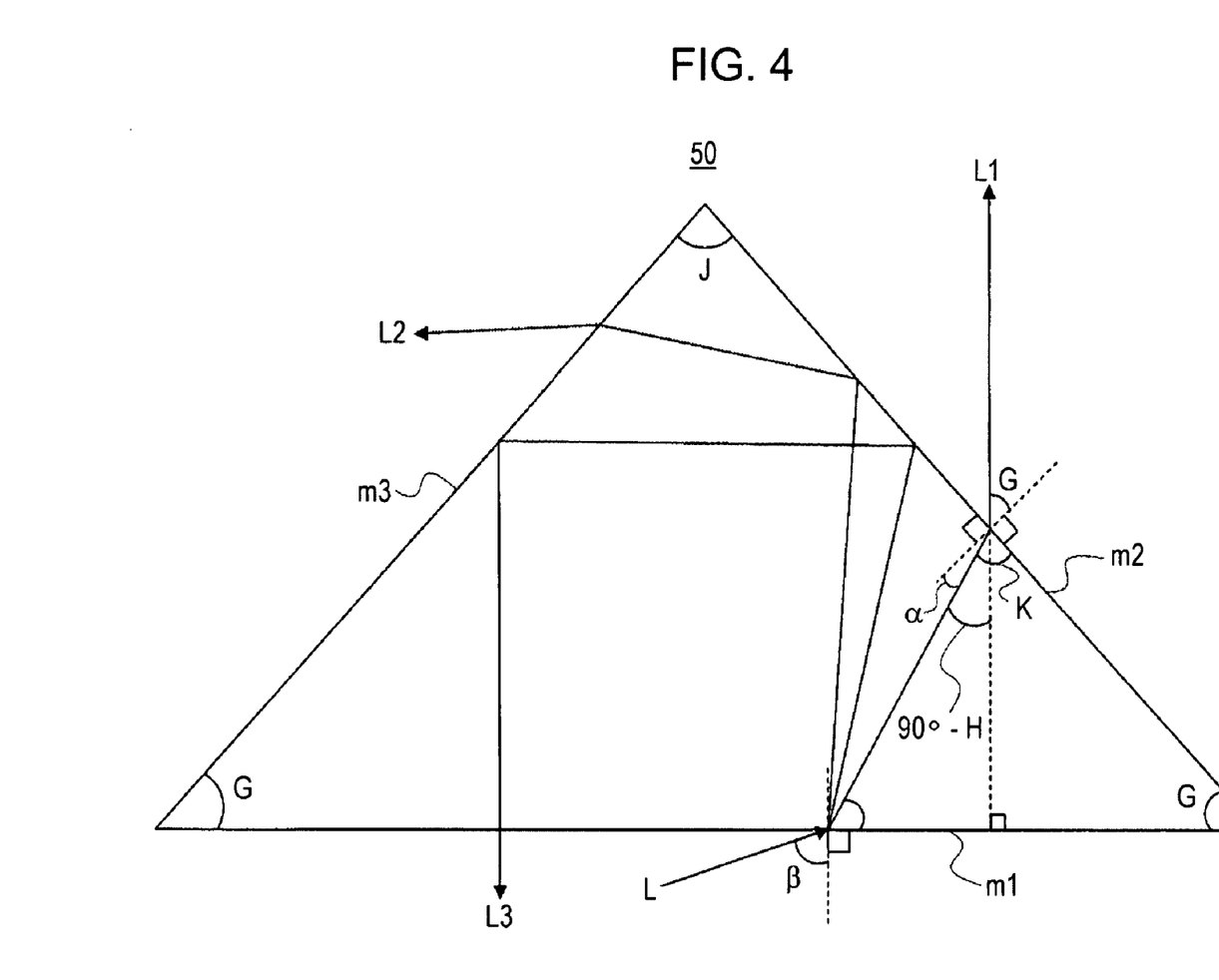
FIG. 4 is an enlarged view illustrating the prism of the prism sheet of the invention.

FIG. 4 is an enlarged view of one prism 50 of the prism sheet 12 shown in FIG. 1. The prism of the prism sheet 12 is formed in an isosceles triangle. Therefore, it is possible to determine the shape of the prism by determining an apex angle J of the triangle. In this embodiment, the prism sheet 12 having a refractive index of 2 is used.

The light component L emitted from the optical waveguide 10 is refracted by the base m1 of the prism 50. The refracted light at that time is referred to as a light component L1. In addition, a base angle of the triangular prism 50 is referred to as an angle 'G', an angle formed between the light component L1 and the base m1 is referred to as an angle 'H', and an angle formed between the light component L1 and the side m2 is referred to as an angle 'K'. Further, an incident angle of the refracted light component L1 on the side m2 is referred to as 'α'. For example, when the light component L incident on the prism sheet 12 at an angle β of 76° is vertically emitted to the liquid crystal panel 14, the light component L1 may be emitted from the side m2 in the vertical direction to the base m1. When the light component L1 is emitted from the side m2 in the vertical direction to the base m1, the refraction angle of the light component L1 with respect to the side m2 is α+90°−H, as shown in FIG. 4. Meanwhile, from the relationship between a triangle formed by the path of the light component L1 and the base angle G and the exterior angle thereof, 90°+α=G+H is obtained. When the light component L1 is emitted from the side m2 in the vertical direction to the base m1, the refraction angle is the angle G. Therefore, the apex angle J of the triangle can be calculated by the following expressions 12 to 15. The expression 13 is used to calculate the refraction angle when the light component L is incident on the base m1, and the expression 14 is used to calculate the refraction angle when the light component L1 is incident on the side m2.

[Expression 12]
$$G + H = 90° + \alpha \qquad (12)$$

[Expression 13]
$$\frac{\sin(90° - H)}{\sin(76°)} = \frac{1}{2} \qquad (13)$$

[Expression 14]
$$\frac{\sin(G)}{\sin(\alpha)} = \frac{2}{1} \qquad (14)$$

[Expression 15]
$$J = 180° - 2G \qquad (15)$$
$$= 76°$$

In this way, it is possible to the apex angle J=76° of the triangle. That is, in the case in which the prism sheet 12 has a refractive index of 2, when the apex angle of the triangular pattern is 76°, it is possible to emit light incident on the prism sheet 12 at an angle β of 76° in the vertical direction to the liquid crystal panel 14.

Meanwhile, light incident on the prism sheet 12 at an angle smaller than the angle β of 76° is totally reflected from the side m2. As shown in FIG. 4, the light totally reflected from the side m2 is incident on a side m3. The light incident on the side m3 is divided into a light component L2 incident on an adjacent prism and a light component L3 which is totally reflected from the side m3 to be emitted from the base m1. Both the light components return to the optical waveguide 10 and travel in the optical waveguide 10 while being repeatedly reflected from the inner surfaces thereof. Then, the light components are emitted to the prism sheet 12 as the light components L again. As such, the light components L recycle this optical path until they are emitted from the prism sheet 12 to the liquid crystal panel 14. In this way, the illuminating device of the invention can improve the usage efficiency of light.

Figure 5A:
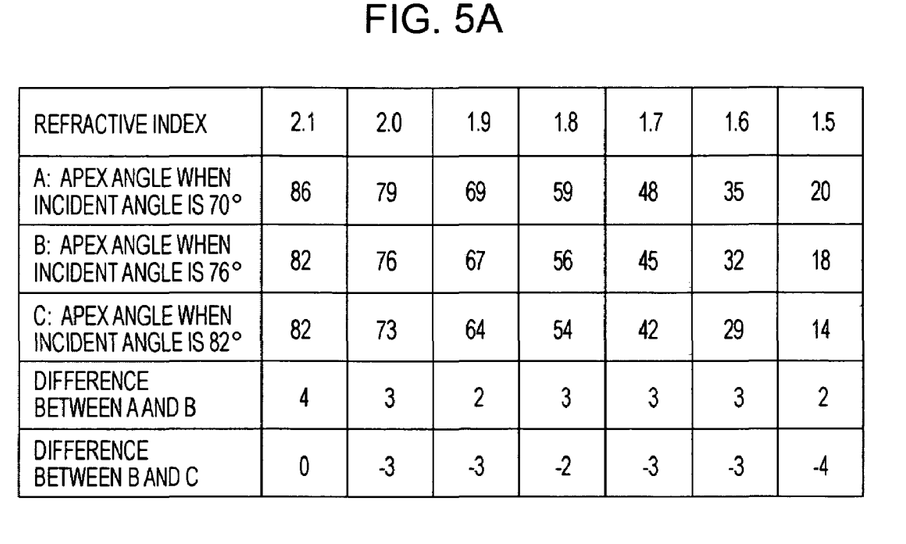
FIG. 5A is a table illustrating the relationship between the apex angle and the refractive index of the prism.
Figure 5B:
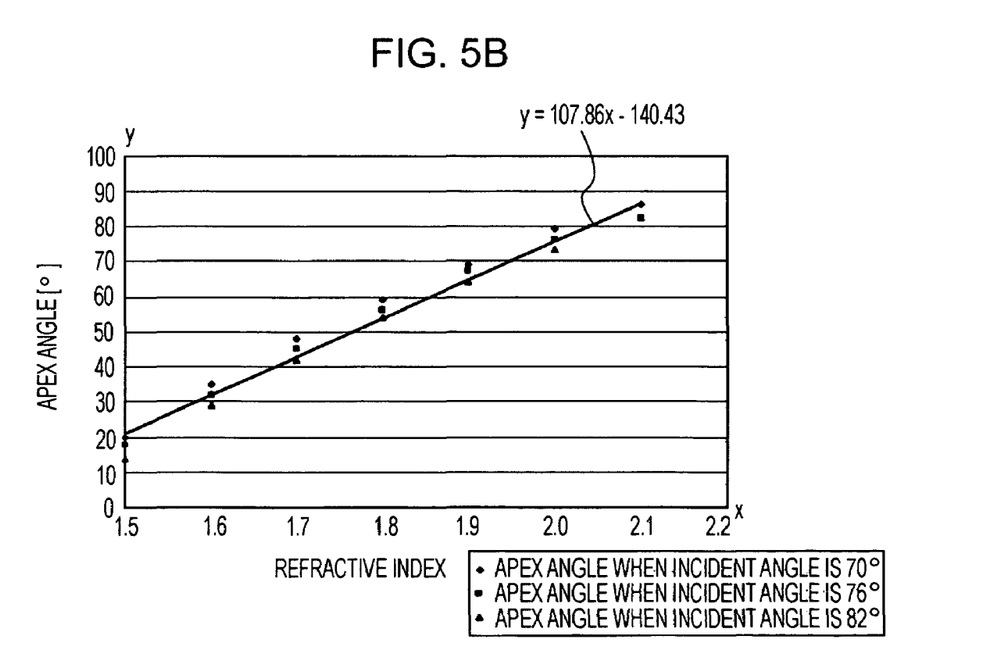
FIG. 5B is a graph illustrating the relationship between the apex angle and the refractive index of the prism.

FIG. 5A shows a table illustrating the relationship between the refractive index of the prism sheet and the apex angle of the prism causing light components incident on the prism sheet at angles β of 70°, 76°, and 82° in the vertical direction to the liquid crystal panel. More specifically, when light components are incident on the prism sheet at angles β of 70°, 76°, and 82°, the apex angles of prism sheets having reflective indexes of 1.6, 1.7, 1.8, 1.9, 2, and 2.1 are calculated by the expressions 12 to 15. FIG. 5B is a graph plotting the values of the apex angles of prisms when light is incident on the prisms at the angles β of 70°, 76°, and 82°. In the graph shown in FIG. 5B, the x-axis indicates the refractive index of the prism sheet, and the y-axis indicates the apex angle of the prism. As shown in FIG. 5B, the proportional relationship is established between the refractive index x of the prism sheet and the apex angle y of the prism. In the graph shown in FIG. 5B, linear approximation is performed on data related to light incident on the prism sheet at an angle β of 76° where the highest brightness is obtained from the optical waveguide, which makes it possible to obtain the following expression 16 between the refractive index x of the prism sheet and the apex angle y of the prism:

$$y=107.86x-140.43 \quad (16).$$

As can be seen from FIG. 5A, when the refractive index of the prism sheet is 2.1, the largest angular difference of 4° occurs between the apex angle of the prism when light is incident at an angle β of 70° and the apex angle of the prism when light is incident at an angle β of 76°. In addition, when the refractive index of the prism sheet is 1.5, the largest angular difference of −4° occurs between the apex angle of the prism when light is incident at an angle β of 82° and the apex angle of the prism when light is incident at an angle β of 76°. That is, when the apex angel of a prism is within the angular range of −4° to 4° with respect to the apex angle of the prism calculated by the expression 16, light having 90 or more percent of the highest brightness can be emitted to the liquid crystal panel by the prism sheet. Thus, it is preferable that, in order to improve brightness and the usage efficiency of light, the prism be formed such that the apex angle y thereof satisfies the following expression 17 with respect to the refractive index x of the prism sheet:

$$y=107.86x-140.43+M(-4 \leq M \leq 4) \quad (17).$$

In addition, when light is incident on the prism sheet at an angle β of 76°, the brightness of light emitted from the optical waveguide increases. Therefore, in this case, it is more preferable that the apex angle y of the prism satisfy the following expression 18 to emit light from the prism sheet to the liquid crystal panel in the vertical direction:

$$y=107.86x-140.43 \quad (18).$$

The use of the expressions 17 and 18 makes it possible to easily calculate the apex angle of the prism at which high brightness and high usage efficiency of light is obtained at any the refractive index where the apex angle of the prism is not calculated. As such, when the prism is formed in a shape where the relationship between the apex of the prism and the refractive index of the prism sheet satisfies the above-mentioned expressions, it is possible to manufacture a prism sheet capable of improving the brightness and usage efficiency of light even when the number of parts of the illuminating device decreases, as shown in FIG. 1.

The refractive index of a general prism sheet is in a range of about 1.3 to 1.8. In addition, when the refractive index of the prism sheet generally used is 1.58, the prism thereof has an apex angle of 90°. However, in the prism sheet having a refractive index of 1.58, the apex angle of the prism is calculated as 29.99° by the expression 18. Therefore, it is understood that, in order to improve brightness and the usage efficiency of light, by using the prism sheet having a refractive index of 1.58, the prism needs to have an apex angle of 29.99°, not an apex angle of 90°. When a prism sheet having high brightness and high usage efficiency of light is manufactured, it is preferable to use a prism sheet having a refractive index of 1.7 to 1.8 where the apex angle of the prism is within an angular range of 42.93° to 53.72° as calculated by the expression 18, from the viewpoint of the convenience of manufacture.

FIGS. 6A to 6D show the optical waveguide 10 applicable to the illuminating device of the invention shown in FIG. 1. As described above, an optical waveguide applicable to a general illuminating device can be used for the illuminating device according to the invention.

Figure 6A:
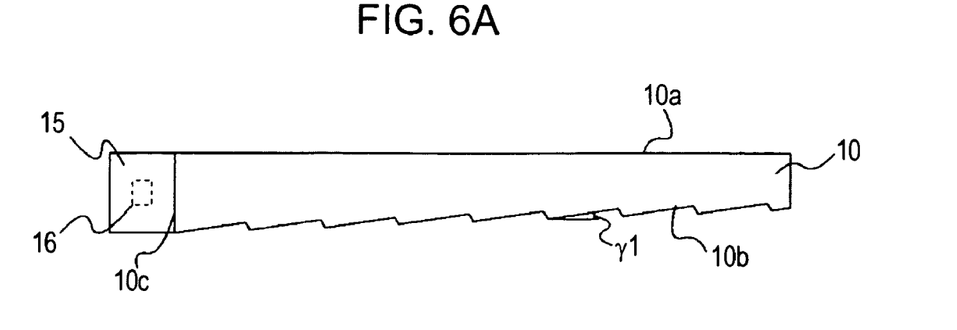
FIGS. 6A to 6D are side views illustrating optical waveguides according to embodiments of the invention.

The optical waveguide 10 shown in FIG. 6A has a wedge shape, and a step-shaped pattern is formed on the reflective surface 10b. The step-shaped pattern functions as an effective reflective surface for reflecting light from the inner surface of the optical waveguide. In order to make light emitted from the optical waveguide incident on the prism sheet at an angle of 76°, an inclination angle γ1 of one step-shaped pattern constituting the effective reflective surface is preferably smaller than 5°.

Figure 6B:
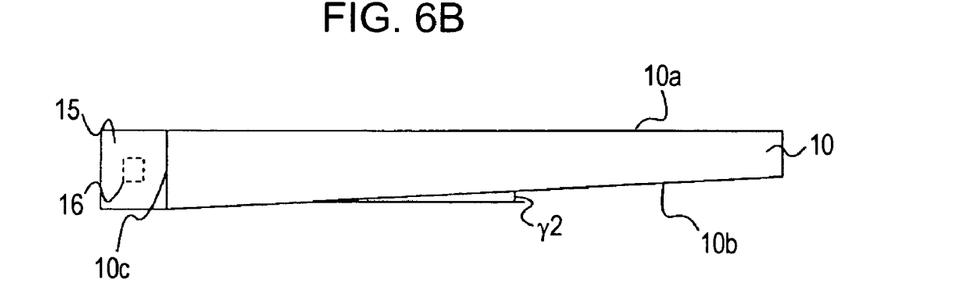

The optical waveguide 10 shown in FIG. 6B has a wedge shape, and a specific pattern is not formed on the reflective surface 10b, that is, the reflective surface 10b is a mirror surface. In order to make light emitted from the optical waveguide incident on the prism sheet at an angle of 76°, an inclination angle γ2 of the reflective surface 10b is preferably smaller than 5°.

Figure 6C:
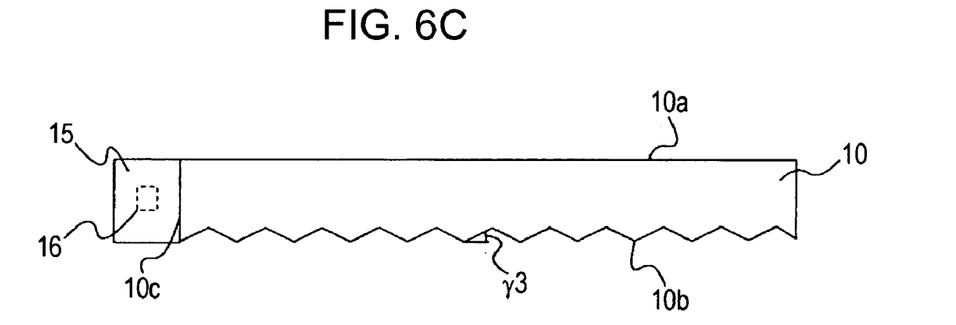

The optical waveguide 10 shown in FIG. 6C has a rectangular shape, and a concave prism pattern is formed on the reflective surface 10b in a direction perpendicular to the direction where light emitted through the light incident surface 10c travels. The prism pattern functions as an effective reflective surface for reflecting light from the inner surface of the optical waveguide. In order to make light emitted from the optical waveguide incident on the prism sheet at an angle of 76°, an inclination angle γ3 of the prism pattern, serving as the effective reflective surface, is preferably smaller than 5°.

Figure 6D:
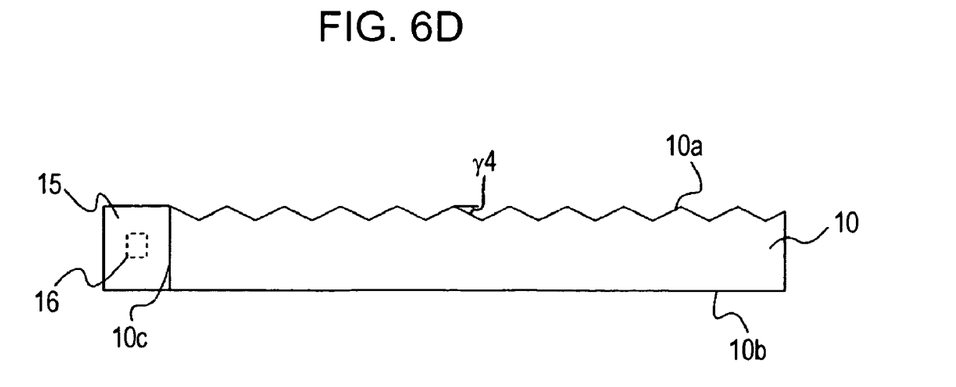

The optical waveguide 10 shown in FIG. 6D has a rectangular shape, and a concave prism pattern is formed on the emission surface 10a in a direction perpendicular to the direction where light emitted through the light incident surface 10c travels. The prism pattern functions as an effective reflective surface for reflecting light from the inner surface of the optical waveguide. In order to make light emitted from the optical waveguide incident on the prism sheet at an angle of 76°, an inclination angle γ4 of the prism pattern, serving as the effective reflective surface, is preferably smaller than 5°.

Modifications

Figure 7A:
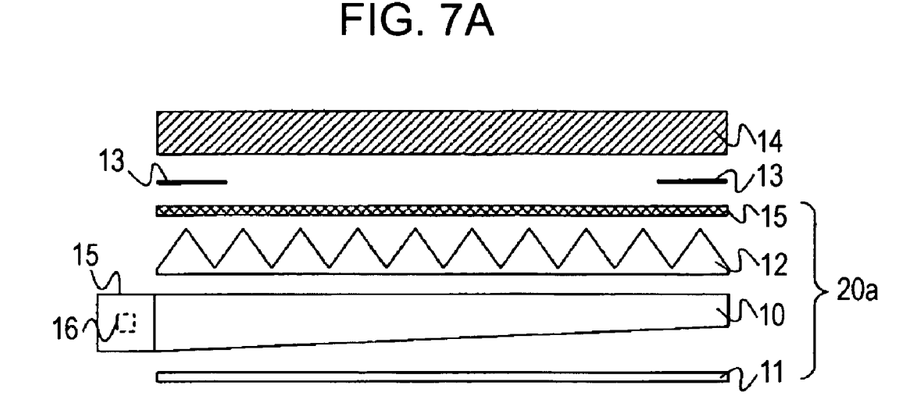
FIGS. 7A to 7C are side views illustrating modifications of the liquid crystal display device according to the embodiment of the invention.
Figure 7B:
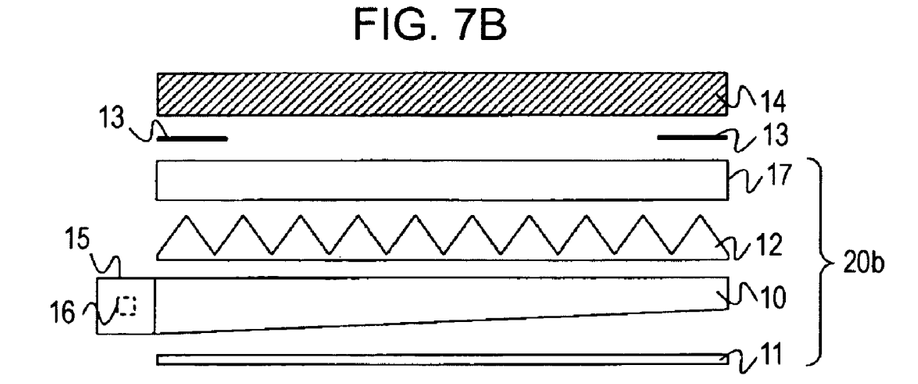
Figure 7C:
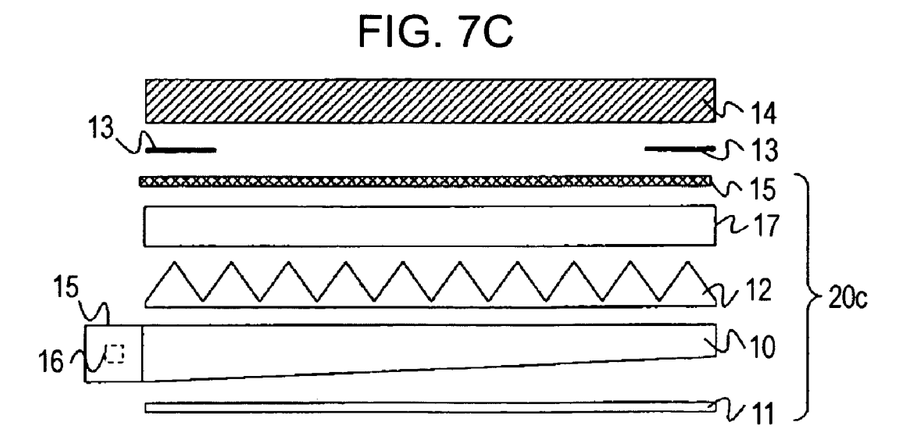

Next, modifications of the illuminating device according to the invention will be described. FIGS. 7A to 7C show modifications of the illuminating device according to the invention. The liquid crystal panel 14 is provided with linear elements having a matrix or stripe shape. Therefore, when the ridge of the prism sheet 12 is parallel to some of the linear elements of the liquid crystal panel 14, interference (moiré) occurs therebetween. FIG. 7A shows an illuminating device 20a according to a modification. In the illuminating device 20a shown in FIG. 7A, a diffusing sheet 15 is arranged between the prism sheet 12 and the liquid crystal panel 14. This structure makes it possible to diffuse light emitted from the prism sheet 12 and thus to uniform the brightness of light. Thus, the illuminating device 20a has an effect of suppressing the occurrence of moiré between the prism sheet 12 and the liquid crystal panel 14, in addition to the effects obtained by the prism sheet 12.

FIG. 7B shows an illuminating device 20b according to another modification. In the illuminating device 20b shown in FIG. 7B, an additional prism sheet 17 is arranged between the prism sheet 12 and the liquid crystal panel 14 such that the ridge of the prism sheet 17 is perpendicular to the ridge of the prism sheet 12. In this way, in the illuminating device 20b, light components emitted in the ridge direction of the prism sheet 12 is refracted to the liquid crystal panel 14 by the prism sheet 17 in addition to the prism sheet 12.

FIG. 7C shows an illuminating device 20c according to still another modification. In the illuminating device 20c shown in FIG. 7C, the diffusing sheet 15 and the prism sheet 17 are arranged between the prism sheet 12 and the liquid crystal panel 14. In this way, the illuminating device 20c has an effect of suppressing the occurrence of moiré and of refracting light components emitted in the ridge direction of the prism sheet 12 toward the liquid crystal panel 14, in addition to the effects obtained by the prism sheet 12.

Electronic Apparatus

Next, embodiments of an electronic apparatus to which the liquid crystal display device 100 of the invention is applicable will be described with reference to FIG. 8.

First, a description will be made of a portable personal computer (a so-called notebook computer) having the liquid crystal display device 100 according to the invention as a display unit thereof. FIG. 8A is a perspective view illustrating the structure of the personal computer. As shown in FIG. 8A, a personal computer 710 includes a main body 712 having a keyboard 711 and a display unit 713 to which the liquid crystal display panel of the invention is applied.

Successively, a description will be made of a cellular phone having the liquid crystal display device 100 according to the invention as a display unit thereof. FIG. 8B is a perspective view illustrating the structure of the cellular phone. As shown in FIG. 8B, a cellular phone 720 includes a plurality of operating buttons 721, an earpiece 722, a mouthpiece 723, and a display unit 724 to which the liquid crystal display device 100 of the invention is applied.

Figure 8A:
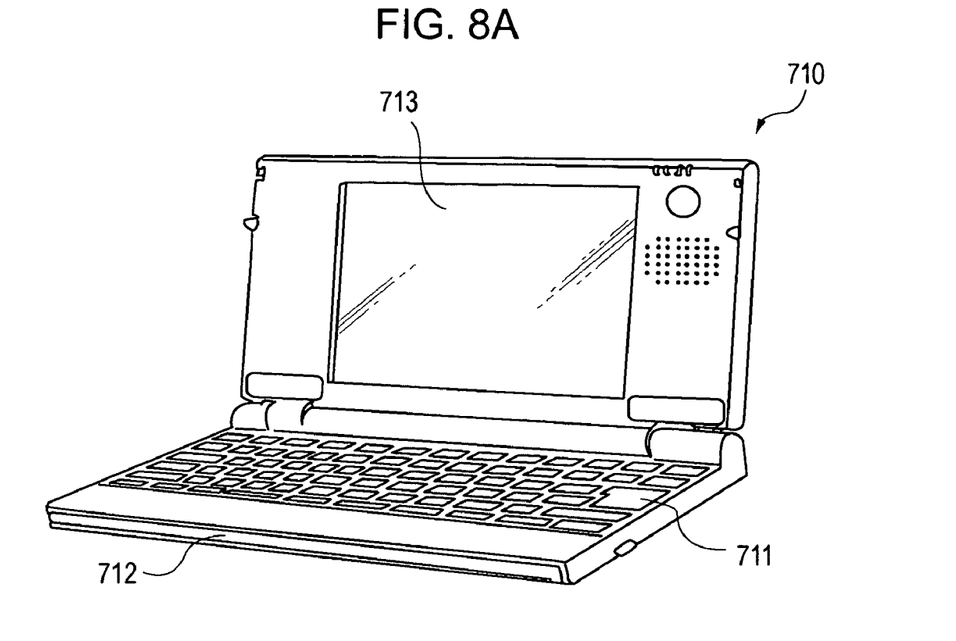
FIGS. 8A and 8B are conceptual views illustrating electronic apparatuses provided with an illuminating device according to the invention.
Figure 8B:
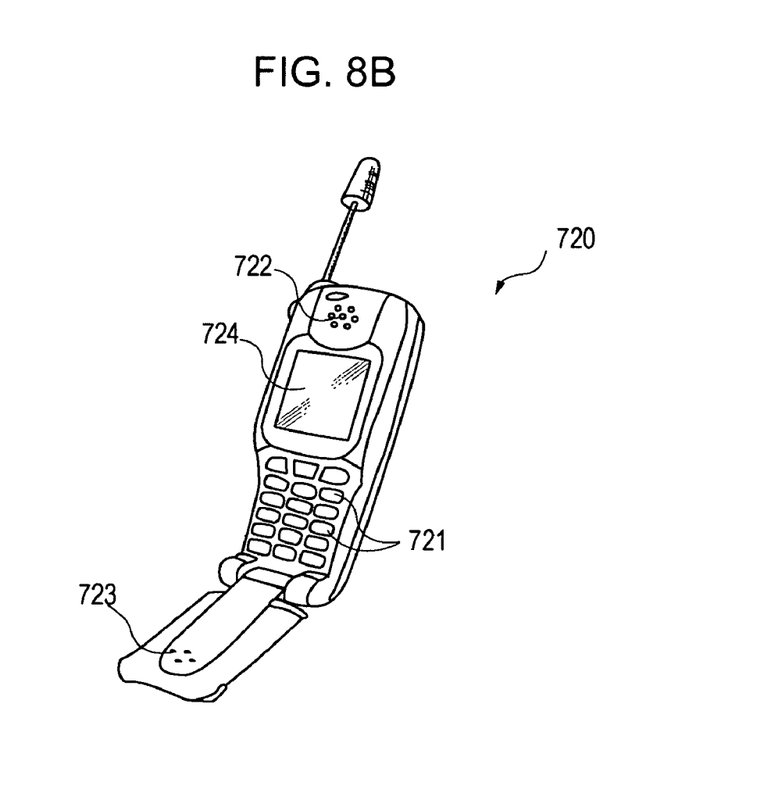

Further, the liquid crystal display device 100 of the invention can be applied to various electronic apparatuses, such as a liquid crystal television set, a view-finder-type/monitor-direct-view-type videotape recorder, a car navigation apparatus, a pager, an electronic organizer, an electronic calculator, a word processor, a workstation, a television phone, a POS terminal, and a digital still camera, in addition to the personal computer shown in FIG. 8A and the cellular phone shown in FIG. 8B.

The entire disclosure of Japanese Patent Application No. 2005-03877, filed Feb. 16, 2005, is expressly incorporated by reference herein.

What is claimed is:

1. An illuminating device comprising:
   a light source;
   an optical waveguide that has a wedge shape in sectional view and that includes a light incident surface, an emission surface, and a reflective surface, the emission surface and the reflective surface being opposite from each other, the emission surface emitting light from the light source and the reflective surface having an inclination angle that is smaller than 5° with respect to the emission surface; and
   a prism sheet that is provided on the emission surface side of the optical waveguide, wherein the following relationship is established between a refractive index x of the prism sheet and an apex angle y of prisms in the prism sheet:

$$y=107.86x-140.43+M(-4\leq M\leq 4)$$

wherein x is 1.7 to 1.8 and y is 42.93° to 53.72°.

2. The illuminating device according to claim 1, further comprising:
   a diffusing sheet that is provided on the emission surface side of the prism sheet to diffuse light.

3. The illuminating device according to claim 1, further comprising:
   a second prism sheet that is provided on the emission surface side of the prism sheet such that the ridges of prisms of the prism sheet and the second prism sheet are perpendicular to each other.

4. The illuminating device according to claim 3, further comprising:
   a diffusing sheet that is provided on the emission surface side of the second prism sheet to diffuse light.

5. The illuminating device according to claim 1, wherein the optical waveguide emits light so as to be incident on the prism sheet at an angle of 70° to 82°.

6. The illuminating device according to claim 1, wherein the optical waveguide emits light so as to be incident on the prism sheet at an angle of 76°.

7. The illuminating device according to claim 1, wherein the larger a distance from the light incident surface is, the smaller a gap between the emission surface and the reflective surface becomes, and an effective reflective surface of the reflective surface is formed in a step shape.

* * * * *